US010187470B2

(12) United States Patent
Moriguchi et al.

(10) Patent No.: US 10,187,470 B2
(45) Date of Patent: Jan. 22, 2019

(54) GATEWAY DEVICE AND SENSOR DATA COLLECTION SYSTEM

(71) Applicant: HITACHI SOLUTIONS, LTD., Tokyo (JP)

(72) Inventors: Akira Moriguchi, Tokyo (JP); Yuichi Nakamura, Tokyo (JP); Masanori Irie, Tokyo (JP); Atsuhiko Tani, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 157 days.

(21) Appl. No.: 15/309,568

(22) PCT Filed: Jun. 10, 2015

(86) PCT No.: PCT/JP2015/066731
§ 371 (c)(1),
(2) Date: Nov. 8, 2016

(87) PCT Pub. No.: WO2015/194432
PCT Pub. Date: Dec. 23, 2015

(65) Prior Publication Data
US 2017/0149900 A1    May 25, 2017

(30) Foreign Application Priority Data
Jun. 20, 2014   (JP) .................................. 2014-126874

(51) Int. Cl.
*G06F 15/16*    (2006.01)
*H04L 29/08*    (2006.01)
(Continued)

(52) U.S. Cl.
CPC .......... *H04L 67/12* (2013.01); *G05B 23/0221* (2013.01); *H04L 12/66* (2013.01);
(Continued)

(58) Field of Classification Search
CPC .... H04W 4/38; H04W 4/70; H04L 29/08558; H04L 67/12; G05B 23/00–23/024
See application file for complete search history.

(56) References Cited

U.S. PATENT DOCUMENTS

| 2012/0197852 A1* | 8/2012 | Dutta ................. H04L 67/2804 707/692 |
| 2014/0303769 A1* | 10/2014 | Koyama ............ G05B 23/0208 700/121 |
| 2017/0111158 A1* | 4/2017 | Nagrath ................ H04L 5/0091 |

FOREIGN PATENT DOCUMENTS

| JP | 08-305990 A | 11/1996 |
| JP | 2007-329664 A | 12/2007 |

(Continued)

OTHER PUBLICATIONS

International Search Report of PCT/JP2015/066731 dated Aug. 25, 2015.

*Primary Examiner* — Brendan Y Higa
(74) *Attorney, Agent, or Firm* — Mattingly & Malur, PC

(57) ABSTRACT

The data acquisition unit acquires sensor data according to an acquisition rule stored in the acquisition and processing rule DB. Then the data acquisition unit determines a representative value for each predetermined time interval on acquired data according to the buffer setting information stored in the buffer setting information DB and saves at least a predetermined number of representative values in the buffer provided in the main memory. The processing unit processes the predetermined number of representative values saved in the buffer to determine the processed data according to a processing rule stored in the acquisition and processing rule DB. The data upload unit transmits to the M2M server the processed data determined by the processing unit.

1 Claim, 8 Drawing Sheets

(51) Int. Cl.
    *G05B 23/02*     (2006.01)
    *H04L 12/66*     (2006.01)
    *H04M 11/00*     (2006.01)
    *H04Q 9/00*     (2006.01)
    *H04W 4/70*     (2018.01)
    *H04W 88/16*     (2009.01)

(52) U.S. Cl.
    CPC ........ *H04L 29/08558* (2013.01); *H04L 67/10* (2013.01); *H04M 11/00* (2013.01); *H04Q 9/00* (2013.01); *H04W 4/70* (2018.02); *H04Q 2209/40* (2013.01); *H04W 88/16* (2013.01)

(56) References Cited

FOREIGN PATENT DOCUMENTS

| | | |
|---|---|---|
| JP | 2009-169888 A | 7/2009 |
| JP | 2012-164369 A | 8/2012 |
| JP | 2014-068285 A | 4/2014 |

\* cited by examiner

410 ACQUISITION RULE

| CAN ID | DATA TYPE | BYTE ORDER | START POSITION | DATA LENGTH (BIT) | DATA MODEL |
|---|---|---|---|---|---|
| AAA | ENGINE COOLING WATER TEMPERATURE | LITTLE-ENDIAN | 0 | 8 | uchar |
| DDD | ENGINE RPM | LITTLE-ENDIAN | 8 | 16 | unit16 |

FIG. 4A

430 PROCESSING RULE

| DATA TYPE | PROCESSED DATA ID | DATA LENGTH (BYTE) | PROCESSING METHOD | ARGUMENT |
|---|---|---|---|---|
| ENGINE COOLING WATER TEMPERATURE | 001 | 1 | AVERAGE | 600 (SEC) |
| ENGINE RPM | 002 | 10 | HISTOGRAM | 1000/0/10/100 (INTERVAL WIDTH/ BASELINE/ SECTION NUMBER/ UPDATE INTERVAL) |

FIG. 4B

ENGINE COOLING WATER TEMPERATURE

| ARRAY INDEX | 0 | 1 | 2 | ... | 597 | 598 | 599 |
|---|---|---|---|---|---|---|---|
| | 51 | 55 | 58 | ... | 55 | 55 | 56 |
| TIME | t+1s | t+2s | t+3s | | t+598s | t+599s | t+600s |

FIG. 5A

ENGINE RPM

| ARRAY INDEX | 0 | 1 | 2 | ... | 997 | 998 | 999 |
|---|---|---|---|---|---|---|---|
| | 3888 | 3860 | 3841 | ... | 3610 | 3611 | 3625 |
| TIME | t+10ms | t+20ms | t+30ms | | t+9996ms | t+9998ms | t+10000ms |

FIG. 5B

610 BUFFER SETTING INFORMATION

| DATA TYPE | INTERVAL | TOTAL TIME | REPRESENTATIVE VALUE POLICY |
|---|---|---|---|
| ENGINE COOLING WATER TEMPERATURE | 1 SECOND | 600 SECONDS | MAXIMUM VALUE |
| ENGINE RPM | 10 MILLISECOND | 10 SECONDS | RANDOM |

SETTING AID SCREEN — 800

MEMORY CONSUMPTION ESTIMATE: 103.2 KBYTE — 801

| DATA TYPE | INTERVAL | TOTAL TIME | REPRESENTATIVE VALUE POLICY |
|---|---|---|---|
| ENGINE COOLING WATER TEMPERATURE | 1 SECOND | 600 SECONDS | MAXIMUM VALUE |
| ENGINE RPM | 10 MILLISECOND | 10 SECONDS | RANDOM |

SETTING AID SCREEN — 800

MEMORY CONSUMPTION ESTIMATE: 2012 KBYTE — 801

| DATA TYPE | INTERVAL | TOTAL TIME | REPRESENTATIVE VALUE POLICY |
|---|---|---|---|
| ENGINE COOLING WATER TEMPERATURE | 1 SECOND | 600 SECONDS | MAXIMUM VALUE |
| ENGINE RPM | 0.2 MILLISECOND | 10 SECONDS | RANDOM |

802

GATEWAY DEVICE AND SENSOR DATA COLLECTION SYSTEM

TECHNICAL FIELD

The present invention relates to a gateway device that collects data from sensors for transmitting to a data collection server, and a sensor data collection system.

BACKGROUND ART

The present application claims the benefit of priority to Japanese Patent Application No. 2014-126874, filed on Jun. 20, 2014, the entire disclosure of which is hereby incorporated herein by reference.

Recently, in various industrial fields, there is a growing need for collecting and analyzing data from sensors mounted on equipment and infrastructure for implementing automatic control of the equipment and detecting indications of failure of the equipment. The M2M (Machine to Machine) server needs to collect data from a large number of sensors in order to establish methods of utilizing data such as in analyzing sensor data and detecting failure indication.

Therefore, for example, PTL 1 discloses a sensor data collection system where the gateway device temporarily aggregates data collected from the sensors and ultimately aggregates, in an M2M server all data from the gateway devices.

CITATION LIST

Patent Literature

[PTL 1] Japanese Patent Application Laid-open Publication No. 2014-68285

SUMMARY OF INVENTION

Technical Problem

There is a need for collecting data from temperature sensors and load sensors that are mounted on vehicle engines to predict the time for changing components by analyzing the load on the component in the vehicle. With respect to such needs, it is preferable that data filtering or processing, compression and the like are performed by the gateway device equipped to the vehicle to reduce the load on the M2M server and the amount of data communication. In order to handle such, the gateway device requires to have inside the memory, a buffer for temporarily accumulating data that has arrived from the sensor during a given amount of time.

However, the frequency at which the date arrives from the sensor cannot be predicted beforehand. Since the server includes a large size memory, the server can secure a sufficient size buffer by dynamically expanding the buffer size according to the frequency at which the data arrives or by providing a sufficiently large buffer. However, there is a limit to the memory size that can be loaded on the gateway device. Dynamically expanding the buffer size or securing a sufficiently large buffer beforehand is difficult with gateway devices.

Therefore, the gateway device has to constrain the buffer size to be within an acceptable range. A possible method therefor is to secure a ring buffer of an acceptable size beforehand and store the data in the ring buffer in the order of arrival. However, with this method, processed data may be incorrect due to lack of data of a predetermined time. For example, one hundred ring buffers are provided for obtaining an average of the data that has been sent from a sensor during ten seconds. In this case, if the one hundred data arrives intensively at the last minute, the entire ring buffer will be overwritten so that the average will be that of only the data that had reached intensively at the last minute and may be away from the average of the ten seconds. Further, waveform data would be lost when using only the data that had intensively arrived at the last minute so that a waveform analysis cannot be carried out.

It is an object of the present invention to provide a gateway device that includes a buffer that can retain data required for processing data even when the frequency of data arriving from the sensors temporarily increases, and sensor data collection system that includes such gateway device.

Solution to Problem

To achieve the purpose described above, a gateway device according to the present invention includes a data acquisition unit configured to acquire sensor data according to a predetermined acquisition rule, determine for each predetermined time interval a representative value of the acquired data, and save in a buffer provided in a main memory at least a predetermined number of the representative values, a processing unit configured to process according to a predetermined processing rule the predetermined number of the representative values saved in the buffer to determine a processed data, and a data upload unit configured to transmit to a data collection server the processed data determined by the processing unit.

Further, the sensor data collection system according to the present invention is the aforementioned sensor data collection system including the gateway device and the data collection server, wherein the data collection server comprises a setting management database configured to store buffer setting information including a data type of a sensor, a time interval, a total time being an integral multiple of the time interval, and a representative value acquisition method, a setting aid unit configured to read out the buffer setting information from the setting management database, display on an output device the buffer setting information, upon reception of a modified time interval and a modified total time that are modified, determine an amount of memory consumed in a buffer for each of the data types of the sensors based on the modified time interval and the modified total time, display on the output device a sum of an amount of memory consumed for each of the data types of the sensors and an amount of memory consumed by a predetermined application program, receive approval or disapproval with respect to the sum of the amount of memory consumed, and replace the time interval and the total time included in the buffer setting information with the modified time interval and the modified total time, respectively when receiving the approval, a setting information delivery unit configured to transmit to the gateway device buffer setting information changed by the setting aid unit, and a data collection unit configured to collect the processed data transmitted from the gateway device, the gateway device including a setting information acquisition unit configured to receive the buffer setting information transmitted from the data collection server and the data acquisition unit of the gateway device determining the predetermined number based on the time interval and the total time included in the buffer setting information for the each sensor data type included in the buffer setting information received by the setting information acquisition unit, securing the buffer having at least the predetermined number of array elements as well as setting the time interval as the predetermined time interval, and determining a representative value of data specified by the data type of the sensor according to the representative value acquisition method included in the buffer setting information.

Advantageous Effects of Invention

According to the present invention, data required for processing data can be retained in the buffer provided in the main memory of the gateway device even when the frequency of data arriving from the sensors temporarily increases.

BRIEF DESCRIPTION OF DRAWINGS

For a more complete understanding of the present invention and the advantages thereof, reference is now made to the following description taken in conjunction with the accompanying drawings wherein:

FIG. 4A is a diagram illustrating a configuration example of an acquisition rule stored in the acquisition and processing rule DB;

FIG. 4B is a diagram illustrating a configuration example of a processing rule stored in the acquisition and processing rule DB;

FIG. 5A is a diagram illustrating a configuration example of a buffer for cooling water temperature;

FIG. 5B is a diagram illustrating a configuration example of a buffer for engine rpm (revolutions per minute);

FIG. 6 is a diagram illustrating a configuration example of a buffer setting information stored in the buffer setting information DB;

FIG. 8A is a diagram illustrating an example of a setting aid screen, in a case where the amount of memory consumed in the buffer is within an acceptable amount, displayed on the output device by the setting aid unit of the M2M sever; and FIG. 8B is a diagram illustrating an example of a setting aid screen, in a case where the amount of memory consumed in the buffer exceeds the acceptable amount, displayed on the output device by the setting aid unit of the M2M sever.

DESCRIPTION OF EMBODIMENTS

Embodiments of the gateway device and the sensor data collection system according to the present invention will be described below with reference to the accompanying drawings taking data collected from the sensors mounted on a vehicle as an example. Common configuration elements are attached the same reference number throughout the drawings that describe the embodiments and duplicate explanation thereof will be omitted.

Figure 1:
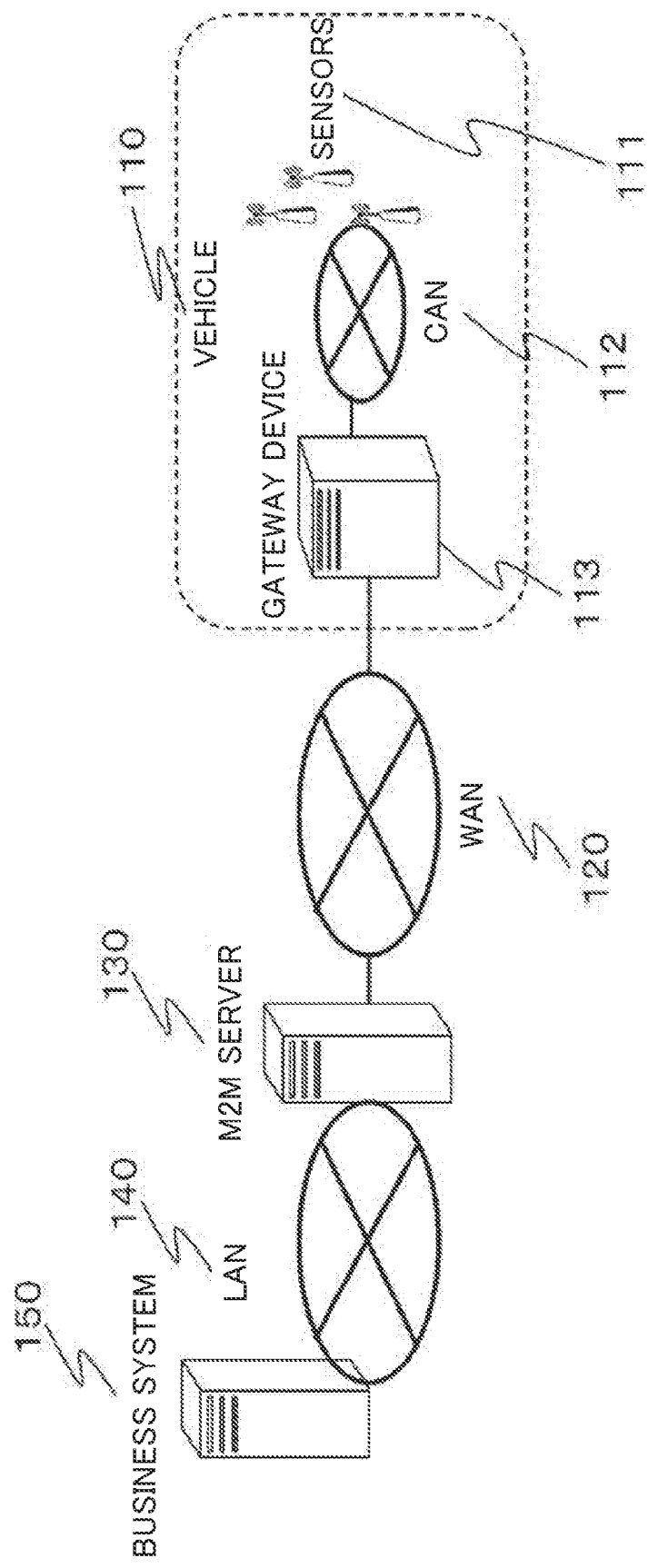
FIG. 1 is a diagram illustrating a configuration example of a sensor data collection system according to one embodiment of the present invention.

FIG. 1 is a diagram illustrating a configuration example of a sensor data collection system according to one embodiment of the present invention.

The sensor data collection system according to the embodiment of the present invention includes sensors 111 and a gateway device 113 mounted on the vehicle 110, an M2M server 130 and a business system 150.

The sensors 111 mounted on the vehicle 110 acquire data of the cooling water temperature and the engine rpms.

The gateway device 113 aggregates according to a predetermined acquisition rule, data acquired from the sensors 111 through a local network such as a CAN (Controller Area Network) 112. And the gateway 113 converts and processes according to a predetermined processing rule, the aggregated data to transmit to the M2M server 130 through the WAN (Wide Area Network) 120. Description of the configuration of the gateway device 113 will be given later with reference to FIG. 2.

The M2M server 130 delivers to the gateway device 113 an acquisition rule, a processing rule and buffer setting information as well as accumulates data transmitted from the gateway device 113. Description of the configuration of the M2M server 130 will be given later with reference to FIG. 3.

The business system 150 aggregates the data accumulated in the M2M server 130 through the LAN (Local Area Network) 140 to support businesses. The business system 150, for example, visualizes the data accumulated in the M2M server 130 by statistically processing the data.

Figure 2:
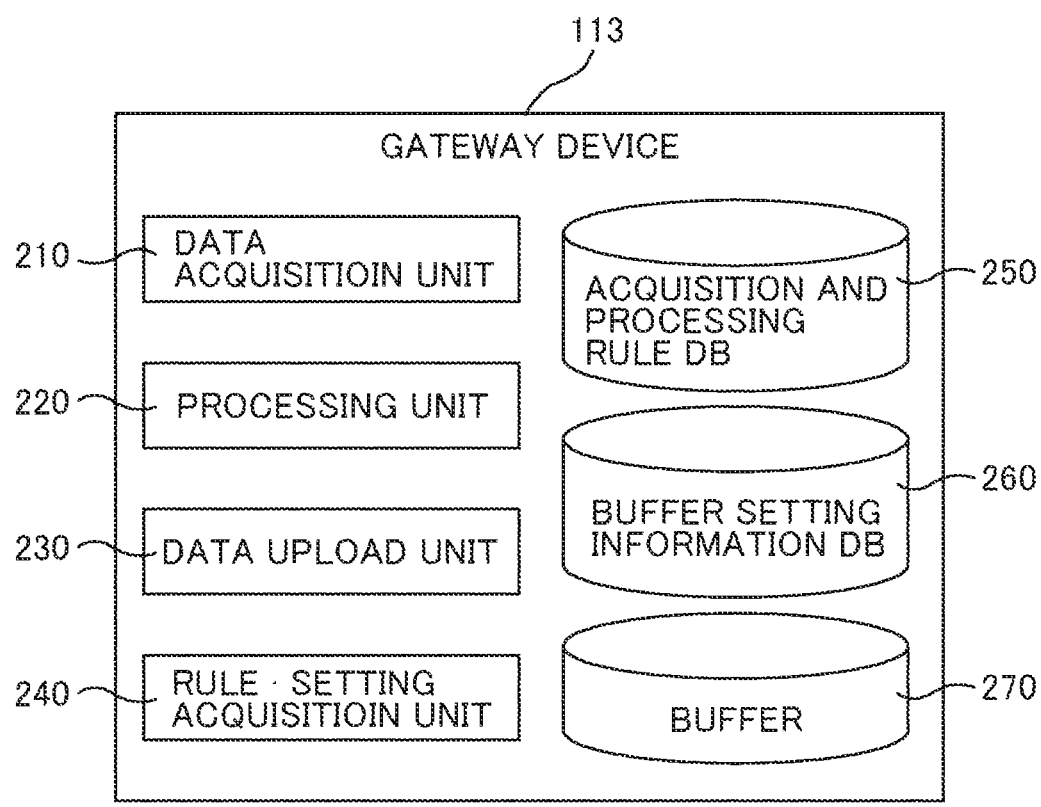
FIG. 2 is a diagram illustrating a configuration example of a gateway device.

FIG. 2 is a diagram illustrating a configuration example of a gateway device 113.

The gateway device 113 includes a main memory that is configured with such as a CPU (Central Processing Unit), a RAM (Random Access Memory) and the like, a storage device that is configured with a hard disk, a flash memory or the like, an interface device for communication with the sensor through the CAN 112, and an interface device for communication with the M2M server 130 through the WAN 120.

The storage device of the gateway device 113 has stored therein an operating system such as Linux (registered trademark), an application program that runs on the operating system, an acquisition and processing rule DB (Data Base) 250 and a buffer setting information DB 260. The functions of the units being the data acquisition unit 210, the processing unit 220, the data upload unit 230 and the rule and setting acquisition unit 240 are implemented by the CPU of the gateway device 113 reading from the storage device and writing into the main memory the operating system and the application program and executing the same.

The buffer 270 is secured in the main memory of the gateway device 113. Here, the buffer 270 may be a ring buffer.

The data acquisition unit 210 acquires data from the sensors 111 through the CAN 112. Data from each sensor is broadcasted by the CAN 112 at an arbitrary timing. Data to be broadcasted have coupled thereto binary data of the CAN ID (Identifier) and the sensor. The data acquisition unit 210 receives all broadcasted data and acquires according to an acquisition rule stored in the acquisition and processing rule DB 250 only required data. And the data acquisition unit 210 determines a representative value for each predetermined time interval for the acquired data and stores at least a predetermined number of the representative values in the buffer 270. Description of the acquisition rule will be given later with reference to FIG. 4A.

The processing unit 220 processes, according to a processing rule stored in the acquisition and processing rule DB 250 a predetermined number of representative values saved in the buffer 270 to obtain processed data, with the data acquisition unit 210. Description of the processing rule will be given later with reference to FIG. 4B.

The data upload unit 230 transmits processed data processed by the processing unit 220 to the M2M server 130 through the WAN 120.

The rule and setting acquisition unit 240 upon receiving from the M2M server 130 the acquisition and processing rules and the buffer setting information, updates the acquisition and processing rules stored in the acquisition and processing rule DB 250 and the buffer setting information stored in the buffer setting information DB 260. Here the rule and setting acquisition unit 240 is an example of the setting information acquisition unit of the present invention.

The buffer 270 is a save area for the representative values used by the data acquisition unit 210 and the processing unit 220. Description of the buffer 270 will be given later with reference to FIG. 5.

The buffer setting information DB 260 stores therein buffer setting information indicating the way in which the representative values that are to be stored in the buffer 270 are obtained. Description of the buffer setting information will be given later with reference to FIG. 6.

Figure 3:
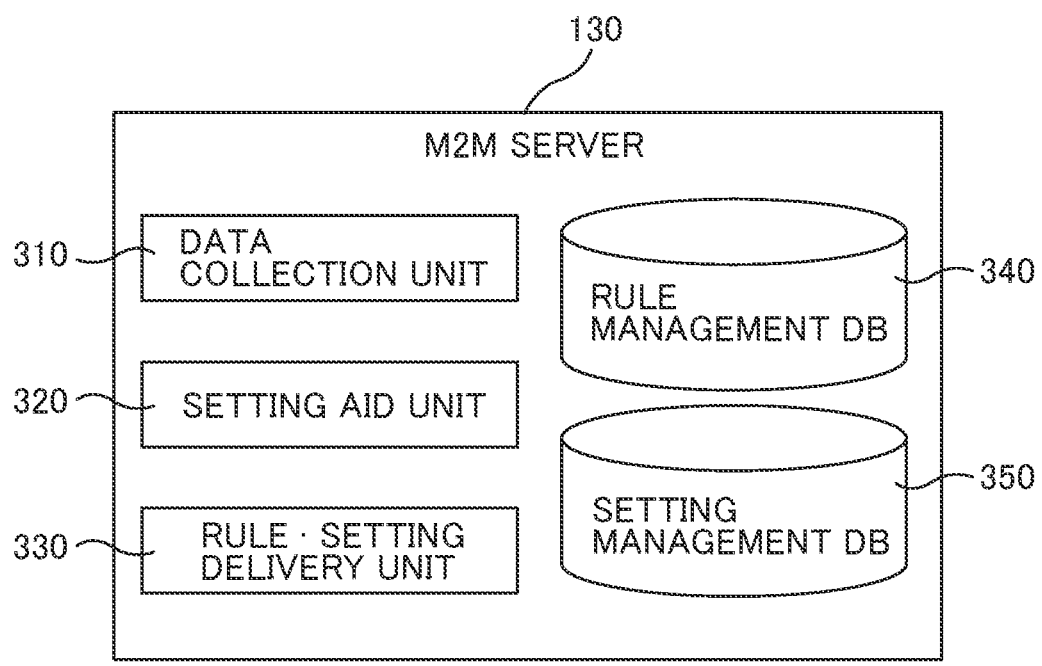
FIG. 3 is a diagram illustrating a configuration example of an M2M server.

FIG. 3 is a diagram illustrating a configuration example of an M2M server.

The M2M server 130 includes a CPU, a main memory that is configured with RAM or the like, a storage device that is configured with a hard disk or the like, an input device that is configured with a mouse or the like, an output device configured with a display or the like, an interface device for communicating with the gateway device 113 through the WAN 12, and an interface device for communicating with the business system 150 through the LAN 140.

The storage device of the M2M server 130 stores therein an operating system such as Linux (registered trademark), an application program that operates on the operating system, a rule management DB 340, and a setting management DB 350. The functions of the units of the data collection unit 310, the setting aid unit 320, and the rule and setting delivery unit 330 are implemented by the CPU of the M2M server 130 reading from the storage device and writing into the main memory the operating system and the application program and executing the same.

The data collection unit 310 receives the processed data sent from the gateway device 113 to save in the storage device.

The setting aid unit 320 displays on the output device buffer setting information stored in the setting management DB 350 and changes the buffer setting information according to the contents input by the user, and transmits the changed buffer setting information to the gateway device 113. Description of the setting aid unit 320 will be given later with reference to FIG. 8.

The rule and setting delivery unit 330 delivers to the gateway device 113 acquisition and processing rules stored in the rule management DB 340 as well as the buffer setting information changed by the setting aid unit 320. The rule and setting delivery unit 330 is an example of the setting information delivery unit of the present invention.

The rule management DB 340 saves therein the acquisition and the processing rules. Further, the setting management DB 350 saves therein the buffer setting information.

The actual operations of the aforementioned gateway device 113 and the M2M server 130 will be described later with reference to FIG. 7.

FIGS. 4A and 4B are diagrams illustrating the configuration examples of an acquisition rule 410 and a processing rule 430 stored in the acquisition and processing rule DB 250. FIG. 4A is a diagram illustrating a configuration example of the acquisition rule 410. FIG. 4B is a diagram illustrating a configuration example of the processing rule 430. The acquisition rule 410 shown in FIG. 4A includes items of a CAN ID 411, a data type 412, a byte order 413, a start position 414, a data length 415 and a data model 416.

The CAN ID 411 is identification information for uniquely indicating what the data flowing through the CAN 112 is. In the case of the CAN 112, identification information for identifying information sent from, for example, a control frame or an ECU (Engine Control Unit) of an engine is entered in the CAN ID 411. Similarly, in the case of a network other than the CAN, identification information for uniquely indicating what the sensor data is is entered in the CAN ID 411. For example, in the case of ZigBee (registered trademark), the network address that is identification information that identifies from which sensor node the information came from is entered in the CAN ID 411.

The data type 412 represents the semantics of data such as the engine cooling water temperature and the engine rpm.

The byte order 413 indicates whether the data is a little-endian or a big-endian.

The start position 414 and the data length 415 respectively indicate the start position and the data length of the target data in the packet received from the CAN 112.

The data model 416 represents the data model that is to be converted.

For example, the rule 421 is applied to data whose CAN ID is "AAA" among the data received from the CAN 112. For such data, the data acquisition unit 210 of the gateway device 113 identifies the data in the zeroth to the seventh bit in the packet received form the CAN 112 as the "engine cooling water temperature", and acquires the data placed in the little-endian order to convert into an uchar model.

Further, the rule 422 is applied to data whose CAN ID is "DDD" among the data received from the CAN 112. For such data, the data acquisition unit 210 identifies the data in the eighth to the 23$^{rd}$ bit in the packet received from the CAN 112 as the "engine rpm", and acquires the data placed in the little-endian order to convert to a unit 16 model.

The processing rule 430 shown in FIG. 4B includes items of a data type 431, a process data ID (identifier) 432, a data length (byte) 433, a processing method 434 and an argument 435.

The processing rule 430 indicates the processing rule for processing data (representative value) saved in the buffer 270 according to the acquisition rule 410.

For example, the rule 441 indicates the processing rule for data (representative value) that was identified as the "engine cooling water temperature" according to the acquisition rule 410. The rule 441 means to acquire in a data length of "one byte", the "average value" of the applicable data (representative value) during the "600 seconds" and imparts a processed data ID "D01" to the "average value."

The rule 442 is an example of a complicated processing rule that acquires a histogram. The rule 442 indicates a processing rule for data identified as the "engine rpm" according to the acquisition rule 410. The rule 442 means to create a "histogram" of "rpm width of zero to 100 rpm, block numbers 10" and impart a processed data ID "D02" to the "histogram" and save "for 100 seconds" in the "10 byte" area.

FIGS. 5A and 5B are diagrams illustrating the configuration examples of the buffer 270. FIG. 5A is a diagram illustrating a configuration example of the buffer 270 for the engine cooling water temperature. FIG. 5B is a diagram illustrating a configuration example of the buffer 270 for the engine rpm.

The data acquisition unit 210 secures a number of buffers 270 same as the number of data types 412 included in the acquisition rule 410 stored in the acquisition and processing rule DB 250. The data acquisition unit 210 in the present embodiment secures two buffers 270 that correspond to the engine cooling water temperature and the engine rpm.

For example, the buffer 270 for the engine cooling water temperature shown in FIG. 5A is configured with 600 element numbers each having a single byte length memory area that respectively have assigned array indices of "0" to "599". The representative value of the data that had arrived during a time starting from a certain time "t" until one second had lapsed is stored in the memory area of the array index="0". The representative value of the data that had arrived during the time starting from "t+1" seconds until "t+2" seconds is stored in the memory area of the array index="1". Similarly, the representative value of the data that had arrived during the time starting from "t+n" seconds until "t+(n+1)" seconds is stored in the memory area of the array index="n" and the representative value of the data that had arrived during the time starting from "t+599" seconds until "t+600" seconds is stored in the memory area of the array index="599".

Here, the method of acquiring the number of elements in the array (i.e., the number of representative values), the increasing time interval and the representative value is based on the buffer setting information stored in the buffer setting information DB 260.

FIG. 6 is a diagram illustrating a configuration example of a buffer setting information 610 stored in the buffer setting information DB 260.

The buffer setting information 610 includes items of a data type 611, an interval 612, a total time 613 and a representative value policy 614.

The data type 611 is information same as the data type 412 of the acquisition rule 410 and represents the semantics of the data such as the engine cooling water temperature and the engine rpm. The buffer 270 that corresponds to the buffer setting information 610 is identified using the data type 611. The information 621 is buffer setting information that corresponds to the buffer for the engine cooling water temperature in FIG. 5A. Further, the information 622 is the buffer setting information that corresponds to the buffer for the engine rpm in FIG. 5B.

The interval 612 represents the time that increases each time the index of the array increases by one. For example, since the interval is one second in the example of information 621, the time increases by one second each time the index increases by one with respect to the buffer for the engine cooling water temperature in FIG. 5A. Similarly, since the interval is 10 milliseconds in the example of information 622, the time increases by 10 milliseconds each time the index increases by one with respect to the buffer for the engine rpm in FIG. 5B.

The total time 613 represents the total time period during which the buffer 270 can be stored, and is the time that is an integral multiple of the time set in the interval 612. The data acquisition unit 210 of the gateway device 113 determines the amount of representative values to be stored in the buffer 270 by dividing the total time 613 by the interval 612. The buffer 270 is, for example, a ring buffer that can store an amount of array elements equal to or more than the amount of the representative values determined.

Since the example of information 621 stores data during a time period of 600 seconds at one second intervals, the engine cooling water temperature is in an array having 600 elements, as shown in FIG. 5A. The buffer 270 corresponding to this is, for example, a ring buffer that can store at least 600 array elements.

Similarly, since the example of information 622 stores data during a time period of 10 seconds at 10 millisecond intervals, the engine rpm is in an array having 1000 elements, as shown in FIG. 5B. The buffer 270 corresponding to this is, for example, a ring buffer that can store at least 1000 array elements.

The representative value policy 614 indicates the method in which the representative value is acquired from the data that had arrived during the same time period. For example, the "maximum value" is the representative value policy 614 in the example of information 621. In this case, when a plurality of data has arrived during a time period starting from "t+n" until "t+(n+1)", the data acquisition unit 210 determines the maximum value thereof as the representative value to store in the memory area of the array index="n".

Figure 7:
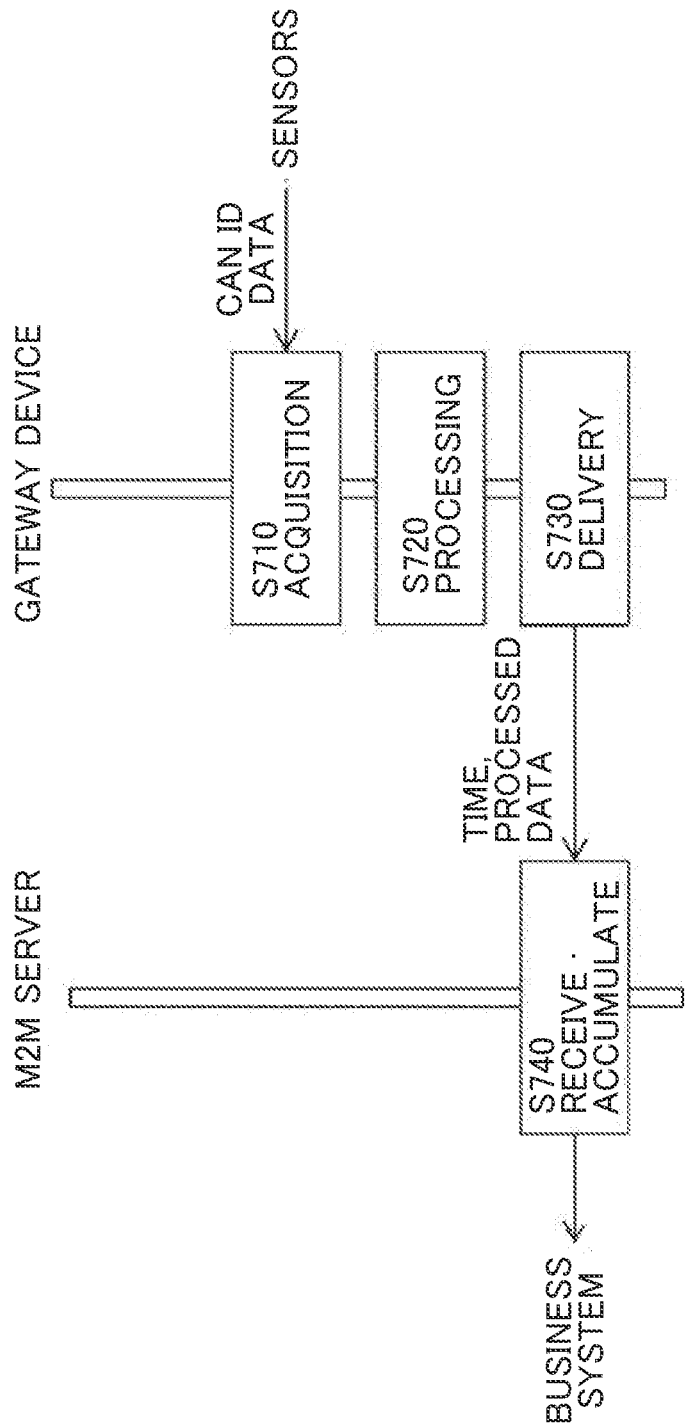
FIG. 7 is a flow diagram illustrating a series of processes starting from acquiring and processing sensor data at the gateway device and until accumulating the processed data in the M2M severs.

FIG. 7 is a flow diagram illustrating a series of processes starting from acquiring and processing sensor data at the gateway device 113 and until accumulating the processed data in the M2M sever 130.

(Step S710)

The data acquisition unit 210 of the gateway device 113 acquires data, in accordance with the acquisition rule 410, from the sensors 111 coupled to the CAN 112. For example, when the data acquisition unit 210 receives a data whose CAN ID is "AAA", the data acquisition unit 210 acquires data in accordance with the rule 421 of the acquisition rule 410 shown in FIG. 4A. In other words, the zeroth to the seventh bits in the received data are placed in little-endian order to be converted into an uchar mode.

Next, the data acquisition unit 210 stores in the memory area of the array index="0" of the buffer 270 for the "engine cooling water temperature" the data converted into the uchar mode, the data arriving during time "t" until "t+1" seconds thereafter. Here, when a plurality of data has been acquired during time "t" to "t+1" seconds, the data acquisition unit 210 saves only the maximum value in the memory area of the array index="0" of the buffer 270 in accordance with the representative value policy 614 of the buffer setting information 610 shown in FIG. 6.

(Step S720)

The processing unit 220 of the gateway device 113 processes the data in the buffer 270 saved at step S710 in accordance with the processing rule 430 shown in FIG. 4B. The processing unit 220 processes the data identified in, for example, the "engine cooling water temperature" in accordance with the rule 441 of the processing rule 430 shown in FIG. 4B. In other words, the processing unit 220 acquires in 600 second intervals from the buffer 270 for the cooling water temperature shown in FIG. 5A data of the past 600 seconds and calculates the average value for saving in the main memory in pairs with D01 being the process data ID 432.

(Step S730)

The data upload unit 230 of the gateway device 113 attaches the time of transmission to the data on the main memory saved at Step S720 to transmit to the M2M server 130. In other words, the data upload unit 230 transmits the time of transmission, the process data ID 432 and the processed data to the M2M server 130.

(Step S740)

The data collection unit 310 of the M2M server 130 receives the data transmitted at Step S730 and accumulates the data in the storage device. The business system 150 utilizes the data accumulated in this way.

FIGS. 8A and 8B are diagrams illustrating examples of the setting aid screen 800 displayed on the output device by the setting aid unit 320 of the M2M sever 130. FIG. 8A is a case when the amount of memory consumed in the main memory is within an acceptable amount. FIG. 8B is a diagram illustrating a case when the amount of memory consumed in the main memory exceeds the acceptable amount.

The setting aid screen 800 includes items of a buffer setting information 801 and a memory consumption estimate 802.

The setting aid unit 320 reads out from the setting management DB 350, buffer setting information to which an initial value is set and displays the buffer setting information on the output device. The user and the like that uses the M2M server 130 can edit the interval and the total time and can select a representative value policy from predetermined representative value policies, with respect to the buffer setting information 801. The setting aid unit 320 upon receiving the modified time interval and the modified total time that are modified by the user and the like, determines the amount of memory in the buffer consumed for each data type of the sensors based on the number of array elements (number of representative values) calculated using the interval and the total time. Then the setting aid unit 320 displays on the output device the sum of the aforementioned amount of memory consumed and the amount of memory consumed by a predetermined application program. The sum of the amount of memory consumed is approved or disapproved by the user and the like. Thereafter, upon receiving an approval, the setting aid unit 320 replaces the time interval and the total time included in the buffer setting information to a modified time interval and a modified total time, respectively.

The rule and setting delivery unit 330 delivers to the gateway device 113 the buffer setting information changed by the setting aid unit 320.

The application program of the gateway device 113 is developed such that the amount of memory consumed by those other than the buffer 270 equals 100 Kbytes, and the main memory is assumed not to be secured dynamically. Further, the acceptable amount of memory consumed in the main memory of the gateway device 113 is 200 Kbytes and the functions of the gateway device 113 are assumed to be harmed when the amount of memory consumed exceeds this value.

In the example shown in FIG. 8A, the total number of elements in the array is (600 secs/1 sec)+(10 secs/10 millisecs)=1600. When each array element is two bytes, the amount of memory consumed in the buffer 270 is 3.2 Kbytes. In this case, the total amount of memory consumed in the main memory is 103.2 Kbytes and thus the above amount of memory consumed is within the acceptable amount.

FIG. 8B assumes a case where the data relating to engine rpm is acquired in smaller pieces and shows an example when the time interval is edited from 10 milliseconds to 0.2 milliseconds. The setting aid unit 320 recalculates the amount of memory consumed when the interval or the total time is edited. The total number of elements in the array in this case is (600 secs/1 sec)+(10 secs/0.2 millisecs)=50600. When each array element is two bytes, the amount of memory consumed in the buffer 270 is 101.2 Kbytes. In this case, the total amount of memory consumed in the main memory is 201.2 Kbytes and thus the above amount of memory consumed exceeds the acceptable amount. Therefore, the setting aid unit 320 highlights the memory consumption estimate 802 and alerts the user and the like that uses the M2M server 130.

In this way, the M2M server 130 allows the user and the like to confirm the amount of memory consumed as well as edit the buffer setting information thereby delivering to the gateway device 113 the buffer setting information that makes the amount of memory consumed become within the acceptable amount and then be reflected to the buffer setting information 610 stored in the buffer setting information DB 260.

As explained above, the present invention can retain in the buffer provided in the main memory of the gateway device the data required for data processing even when the frequency at which the data arriving from the sensors becomes temporarily high.

In other words, the present invention determines the representative value of the sensor data for each predetermined time interval and saves the representative value in the buffer and therefore, the capacity of the buffer is fixed when the time interval and the total time (number of representative value×time interval) is determined. Therefore, the amount of memory consumed can be set a limit that is required to an embedded device.

For example, when data concentrates at the last single second in a process that determines the average of the latest 600 seconds, the amount of data may exceed the acceptable amount of the memory that can be consumed when the memory is secured dynamically. Further, with a simple ring buffer, there is a possibility that only the data of the last single second remains. In contrast, the present invention can leave data of the entire 600 seconds.

Hereinabove, description of embodiments of the present invention has been given, however, various modifications and combinations that would be required depending on design matters or other factors are to be understood to be within the scope of the invention described in the claims and the invention that corresponds to the specific examples described in the description of embodiments of the invention.

REFERENCE SIGNS LIST 110 vehicle, 111 sensors, 112 CAN (Controller Area Network), 113 gateway device, 120 WAN (Wide Area Network), 130 M2M server, 140 LAN (Local Area Network), 150 business system, 210 data acquisition unit, 220 processing unit, 230 data upload unit, 240 rule and setting acquisition unit, 250 acquisition and processing rule DB, 260 buffer setting information DB, 270 buffer, 310 data collection unit, 320 setting aid unit, 330 rule and setting delivery unit, 340 rule management DB, 350 setting management DB, 410 acquisition rule, 430 processing rule, 610 buffer setting information, 800 setting aid screen

The invention claimed is:
1. A sensor data collection system, comprising:
a gateway device, comprising:

a processor connected to a memory, the memory storing instructions that when executed by the processor configure the processor to:

acquire sensor data according to a predetermined acquisition rule, determine for each predetermined time interval a representative value of the acquired data, and save in a buffer provided in a main memory at least a predetermined number of the representative values, process, according to a predetermined processing rule, the predetermined number of the representative values saved in the buffer to determine processed data, and transmit, to a data collection server, the processed data determined by the processing unit, wherein the data collection server comprises:

a processor connected to a memory, the memory storing instructions that when executed by the processor configure the processor to:

store, in a setting management database, buffer setting information including a respective data type of each of a plurality of sensors, a time interval, a total time being an integral multiple of the time interval, and a representative value acquisition method, read out the buffer setting information from the setting management database, display on an output device the buffer setting information, upon reception of a modified time interval and a modified total time, determine an amount of memory consumed in a buffer for each of the data types of the sensors based on the modified time interval and the modified total time, display on the output device a sum of an amount of memory consumed for each of the data types of the sensors and an amount of memory consumed by a predetermined application program, receive approval or disapproval with respect to the sum of the amount of memory consumed, and replace the time interval and the total time included in the buffer setting information with the modified time interval and the modified total time, respectively when receiving the approval, transmit, to the gateway, device buffer setting information changed by the setting aid unit, and collect the processed data transmitted from the gateway device, wherein the processor of the gateway device is configured to receive the buffer setting information transmitted from the data collection server, and determine the predetermined number based on the time interval and the total time included in the buffer setting information for the each sensor data type included in the buffer setting information, secure the buffer having at least a predetermined number of array elements as well as setting the time interval as the predetermined time interval, and determine a representative value of data specified by the data type of the sensor according to the representative value acquisition method included in the buffer setting information.

* * * * *